(12) United States Patent
Zwillinger (10) Patent No.: US 12,425,073 B2
(45) Date of Patent: Sep. 23, 2025

(54) IMPACT INITIATED AUTOMATED INFORMATION TRANSFER

(71) Applicant: Daniel Ian Zwillinger, Newton, MA (US)

(72) Inventor: Daniel Ian Zwillinger, Newton, MA (US)

( * ) Notice: Subject to any disclaimer, the term of this patent is extended or adjusted under 35 U.S.C. 154(b) by 0 days.

(21) Appl. No.: 19/067,916

(22) Filed: Mar. 2, 2025

(65) Prior Publication Data

US 2025/0202532 A1    Jun. 19, 2025

Related U.S. Application Data

(62) Division of application No. 18/214,592, filed on Jun. 27, 2023.

(51) Int. Cl.
*H04B 5/72* (2024.01)
*H04B 1/3827* (2015.01)

(52) U.S. Cl.
CPC .............. *H04B 5/72* (2024.01); *H04B 1/385* (2013.01); *H04B 2001/3861* (2013.01)

(58) Field of Classification Search
CPC ... H04B 5/72; H04B 1/385; H04B 2001/3861
USPC ........................................................ 455/41.1
See application file for complete search history.

(56) References Cited

U.S. PATENT DOCUMENTS

| | | | | |
|---|---|---|---|---|
| 8,219,028 B1 * | 7/2012 | Flamholz | .............. | G06F 1/1694 |
| | | | | 455/41.2 |
| 8,260,883 B2 * | 9/2012 | Mooring | ................. | H04W 4/21 |
| | | | | 345/173 |
| 8,885,285 B1 * | 11/2014 | Nicholls | .............. | G11B 19/043 |
| | | | | 73/12.06 |
| 2011/0161136 A1 * | 6/2011 | Faith | ................... | H04L 63/0861 |
| | | | | 705/14.1 |

* cited by examiner

*Primary Examiner* — Eugene Yun (57) ABSTRACT

A method for impact initiated automated information transfer comprising detecting a physical contact between a first device and a second device, establishing a wireless communication between the devices, determining a first delta acceleration value corresponding to the first device, comparing the first delta acceleration value with a predefined range of negative delta acceleration values representing change in acceleration in a gravity direction and with a predefined range of positive delta acceleration values representing change in acceleration in a direction opposite to the direction of gravity and defining the first device to be an upper device located above the second device if the determined first delta acceleration value falls within the predefined range of positive delta acceleration values, or to be a lower device located below the second device if the determined first delta acceleration value falls within the predefined range of negative delta acceleration values.

11 Claims, 6 Drawing Sheets

| | Actions to be taken by a lower device corresponding to updated rules instructions |
|---|---|
| 1 | DOWNLOAD: On next download, download all stored information |
| 2 | DOWNLOAD: Only download data from device (no uploads), until there is a rule change |
| 3 | PASSWORD: Here is the password XXXX, continue normal behavior |
| 4 | PASSWORD: No additional rule updates until the password XXXX is received |
| 5 | RESET: Delete all information on device (e.g., reset to factory specs) |
| 6 | RESET: Delete all information on device 1 hour after last use |
| 7 | RESET: When uploading any new information, delete all previous information |
| 8 | Sleep for the next 6 hours |
| 9 | When downloading to a printer, only download the last document, not the latest WIFI information |

IMPACT INITIATED AUTOMATED INFORMATION TRANSFER

CROSS-REFERENCE TO RELATED APPLICATIONS

This application is a divisional patent application of co-pending U.S. Utility application Ser. No. 18/214,592, filed Jun. 27, 2023, the entire contents of which are incorporated herein by reference.

FIELD OF THE INVENTION

The present invention in general is related to the field of communications. More particularly, the present invention is related to data transfer initiated by physical contact between two devices.

BACKGROUND OF THE INVENTION

Transfer of data between electronic devices often requires multiple user inputs from either or both of the devices. Conventionally, such a data transfer may need a number of steps involving user interactions. For example, user inputs may be needed to establish a connection between the devices, to select a direction of data transfer and to grant permission to transmit and receive data etc. Sometimes, for many users those steps may not be easy to follow. If the devices transferring the data have a small user interface, which is often the case with mobile devices, the data transfer process becomes even more tedious for the users.

In making the process of transfer of data between two nearby devices easy and quick Near Field Communications (NFC) technology is finding widespread use. This short-range high frequency wireless communications technology exchanges data between devices over a short distance, such as only a few centimeters and use of it can reduce the number of steps required to transfer data. However, NFC by itself does not alleviate the cumbersome user interactions. To this end, methods have been introduced to initiate a data transfer triggered by a physical contact such as a tapping by one device onto another one. However, none of these methods enable the users to set the direction of data flow without interacting with the devices through a user interface. Also, if the device from which data is to be transferred and the device which is to receive the data r are not located in close proximity to each other or if the devices are too bulky and heavy to be moved for a physical contact then the short-range communication techniques fail to help in absence of an intermediary device.

Thus, there exists a need for a system and method which can overcome the above-mentioned problems associated with instant data transfer.

OBJECT OF THE INVENTION

An object of the present invention is to provide a system and method for instantaneous communication between devices.

Yet another object of the present invention is to provide a system and method for data transfer with minimal user interactions.

Still another object of the present invention is to provide a system and method for communication initiated only by physical contact.

Another object of the present invention is to provide a system and method for setting direction of data transfer without the use of user interface.

Another object of the present invention is to provide a system and method for data transfer in a single step.

SUMMARY OF THE INVENTION

The following presents a simplified summary in order to provide a basic understanding of some aspects of the disclosed invention. This summary is not an extensive overview, and it is not intended to identify key/critical elements or to delineate the scope thereof. Its sole purpose is to present some concepts in a simplified form as a prelude to the more detailed description that is presented later.

The present invention is directed to a system and a method for an impact initiated automated information transfer between two electronic devices. The method comprises causing a movement of a first device and/or a second device to make a physical contact between them. On detecting the physical contact, the first device determines a delta acceleration i.e., change in acceleration experienced by it consequent to the physical contact based on a movement vector provided by a sensor module disposed in the first device. This delta acceleration value is then compared with a predefined range of negative delta acceleration values representing a change in acceleration in the direction of gravity and also with a predefined range of positive delta acceleration values representing the change in acceleration in a direction opposite to the direction of gravity. The first device is defined to be an upper device located above the second device if the determined delta acceleration value falls within the predefined range of positive delta acceleration values, or to be a lower device located below the second device if the determined delta acceleration value falls within the predefined range of negative delta acceleration values.

The first and second devices then get configured automatically to wirelessly communicate a set of data based on the relative positions of the devices with respect to each other without requiring any further input from users. In one preferred embodiment, the data transmission always occurs from an upper/above device to a lower/below device with the upper device being located substantially vertically above the lower device.

Selection of the data being transmitted from an upper device to a lower device happens automatically based on a set of rules. The rules may be based on a type of the set of data, a type of the upper and lower devices, a time of making the physical contact, a sequence of the physical contact and a relative location of the devices.

BRIEF DESCRIPTION OF DRAWINGS

In order to describe the manner in which features and other aspects of the present disclosure can be obtained, a more particular description of certain subject matter will be rendered by reference to specific embodiments which are illustrated in the appended drawings. Understanding that these drawings depict only typical embodiments and are not therefore to be considered to be limiting in scope, nor drawn to scale for all embodiments, various embodiments will be described and explained with additional specificity and detail through the use of the accompanying drawings in which.

DETAILED DESCRIPTION OF THE INVENTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein. Accordingly, it is intended that the present invention covers such modifications and variations as come within the scope of the appended claims and their equivalents.

In the following detailed description, numerous specific details are set forth in order to provide a thorough understanding of the invention. However, it will be understood by those skilled in the art that the present invention may be practiced without these specific details. In other instances, well-known methods, procedures and components have not been described in detail so as not to obscure the present invention.

Specific embodiments of the present invention are now described with reference to the figures, wherein like reference numbers indicate identical or functionally similar elements. The terms "tap", "knock", "bang", "strike", "hit" and "touch" are the words which can be alternatively used with respect to a physical contact or impact between two or more devices as described here. A physical contact or an impact is considered to cause sufficient change in momentum of a colliding device to allow a sensor, such as an accelerometer or other similar sensors, to detect the change in acceleration.

Figure 1A:
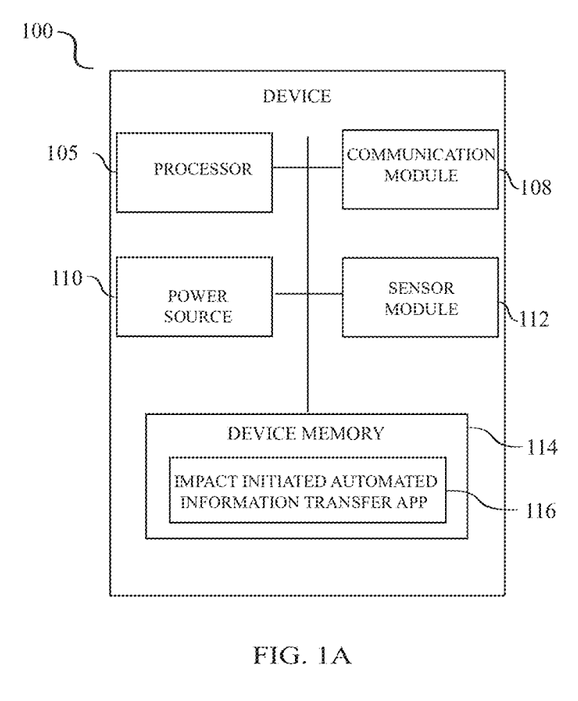
FIG. 1A is a schematic view of a computing device in accordance with an embodiment of the present invention.

FIG. 1 illustrates a schematic diagram of an exemplary computing device 100 which may be implemented in any form of a computing and/or electronic device, and in which embodiments of the methods described above may be implemented. The computing device 100 can be in different forms, such as, for example, a dedicated intermediate device custom made for implementation of the present invention, a mobile phone, a printing device, a personal computer, a portable computing device etc. In devices such as desktop computers, printers, microwave ovens etc. which may not come with factory provided accelerometers, such devices can be retrofitted with an accelerometer to incorporate the present invention.

The device 100 comprises a processor 105, a communication module 108, a power source 110, a sensor module 112 and a device memory 114, all of which are communicatively connected with each other.

Processor 105 can be a microprocessor, controller, application specific integrated circuits (ASICs), programmable logic devices, chipsets, field programmable gate arrays (FPGAs), or any other suitable type of components for processing computer executable instructions to control the operation of the device in order to transfer or receive data on detecting a physical contact as per a set of rules.

The computer executable instructions may be provided using any computer-readable media, such as the memory 114, which may also store any software/application such as the impact initiated automated information transfer app 116. Memory 114 may include internal tables for data related to a set of rules, for example, or other data structures for receiving, transmitting, maintaining and manipulating data used by application 116. Memory 114 may store data corresponding to simple or complex data structures. The term "computer readable medium" as used herein refers to any medium that participates in providing instructions to the processors for execution. A computer readable medium may take many forms, including but not limited to, non-volatile media, volatile media, and transmission media. Non-volatile media includes, for example, optical, magnetic disks, and magneto-optical disks, such as the hard disk or the removable media drive.

The communication module 108 enables the device 100 to wirelessly communicate with other devices, networks, and/or systems. For example, communication module 108 may include a transmitter and a receiver (or a transceiver) for transmitting and receiving data in compliance with various protocols/technologies such as Near Field Communications (NFC), Wireless Application Protocol (WAP), Ultra Wide-Band (UWB) communication, Bluetooth, Wireless Fidelity (Wi-Fi), Transport Control Protocol/Internet Protocol (TCP/IP), Institute of Electrical and Electronics Engineers (IEEE) 802.X, or any other type of wireless and/or wired protocol or standard.

Sensor module 112 is configured to detect a physical contact and provide data related to a movement vector corresponding to a movement experienced by the sensor module 112 or the device 100 during or consequent to a physical contact made by the device 100 with another body/device. The sensor module 112 may include an accelerometer capable of producing a set of readings comprising a plurality of acceleration values with respect to a plurality of axes (axes X, Y and Z, for example) of acceleration corresponding to a movement made by the device 100. The accelerometer may include hardware or a combination of hardware and software for determining an acceleration of the device 100. The accelerometer may be a micro electro mechanical system (MEMS) accelerometer, a piezoelectric accelerometer, or some other type of accelerometer. The sensor module 112 may further include a magnetometer capable of acquiring information as to strengths of magnetic fields in different directions. In some embodiments, sensor module 112 may not comprise the accelerometer and/or the magnetometer and, instead, may include a contact-sensitive sensor (e.g., an electric field sensor, a surface conduction sensor, a pressure/force sensor, a vibration sensitive sensor, etc.) to detect a physical contact.

Figure 1B:
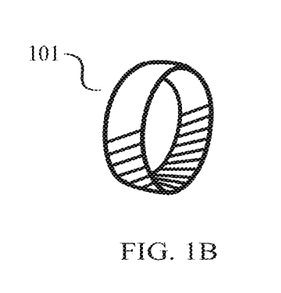
FIG. 1B illustrates another embodiment of a computing device incorporating the present invention.
Figure 1C:
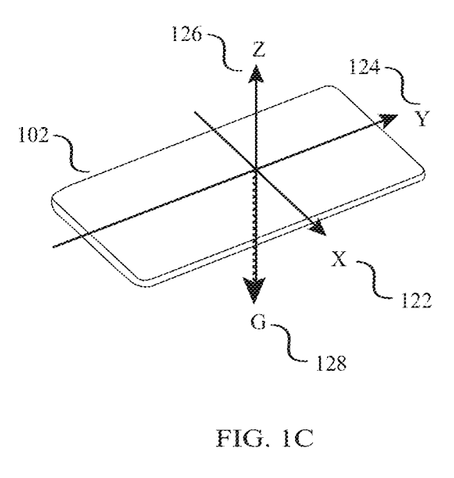
FIG. 1C illustrates three mutually perpendicular lines of a coordinate system shown with respect to a computing device incorporating the present invention.

FIG. 1C illustrates a mobile device 102 incorporating the components of the computing device 100 of the present invention. It also shows a spatial coordinate system comprising X-axis (indicated by 122), Y-axis (indicated by 124) and Z-axis (indicated by 126) with respect to the mobile device 102. Gravity vector "G" indicated by 128 represents the direction of gravity i.e., the direction toward the center of Earth. The sensor module 112 is configured to detect acceleration in each of the three axis directions relative to device 100.

Transfer of data or information from one device to another is needed for various purposes. Reference to FIGS. 2A-2C and 3A-3C, in an exemplary scenario, a document displayed on an active window of a desktop computer 104 is required to be printed by a printer 106 and the devices are not necessarily connected through any wired or wireless network. The present invention makes it possible to transfer the data even under this situation. In this exemplary scenario, the mobile device 102 is used as an intermediary device to transfer the document data to be printed from the desktop computer 104 to the printer 106.

Firstly, the data is transferred from the desktop computer 104 to the intermediate device (a mobile device in the present example) 102. Thereafter, the data is transferred from the intermediate device 102 to the printer 106. In the following description, for both steps, the mobile device 102 is hereinafter referred to as a first device 102 whereas the desktop computer 104 is referred to as a second device 104 for the first step and, for the second step, the printer is referred to as a second device 106.

Figure 4:
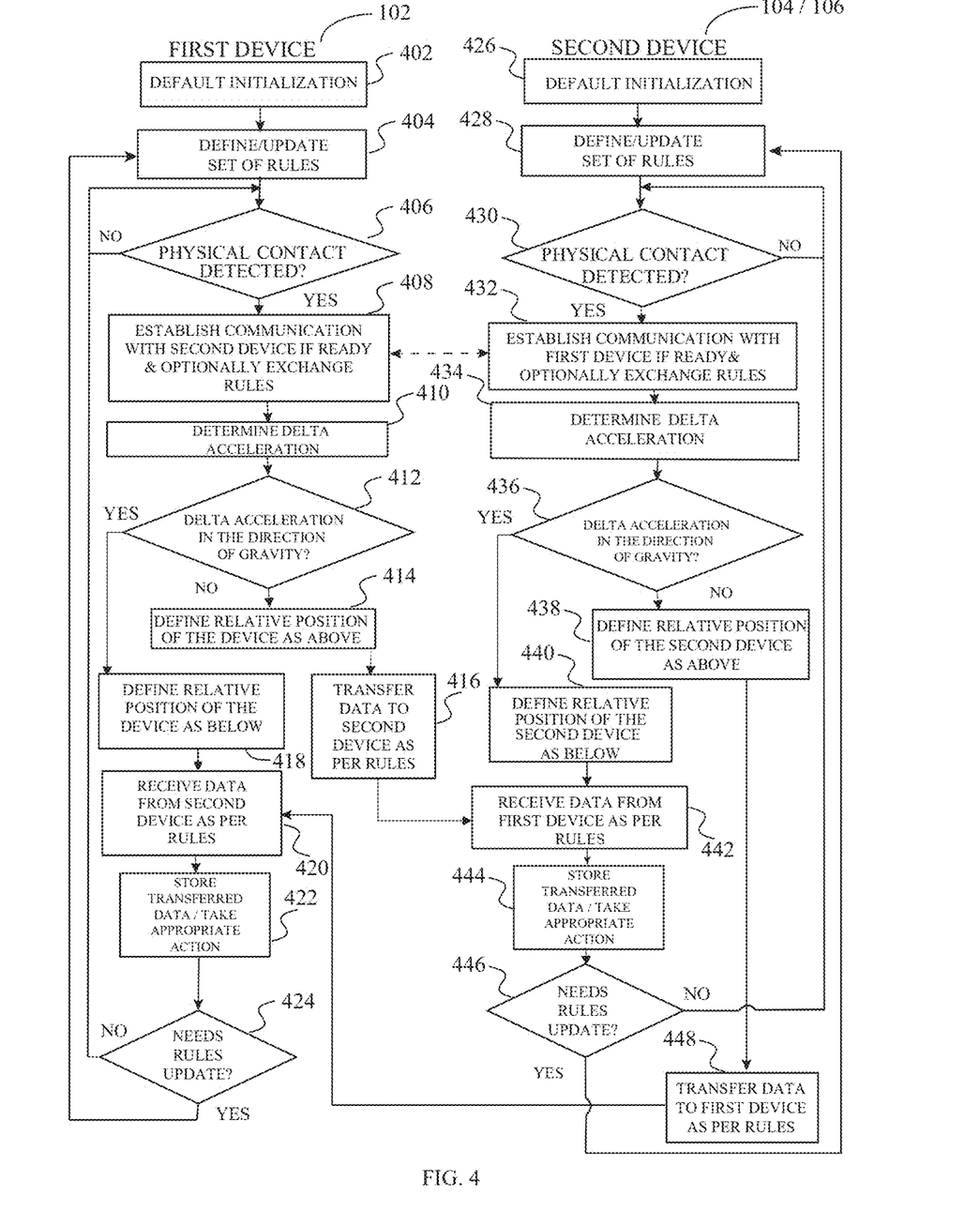
FIG. 4 is a flow diagram illustrating an exemplary process for impact-initiated information transfer between two devices each of which independently determines relative position in accordance with an embodiment of the present invention.
Figure 5:
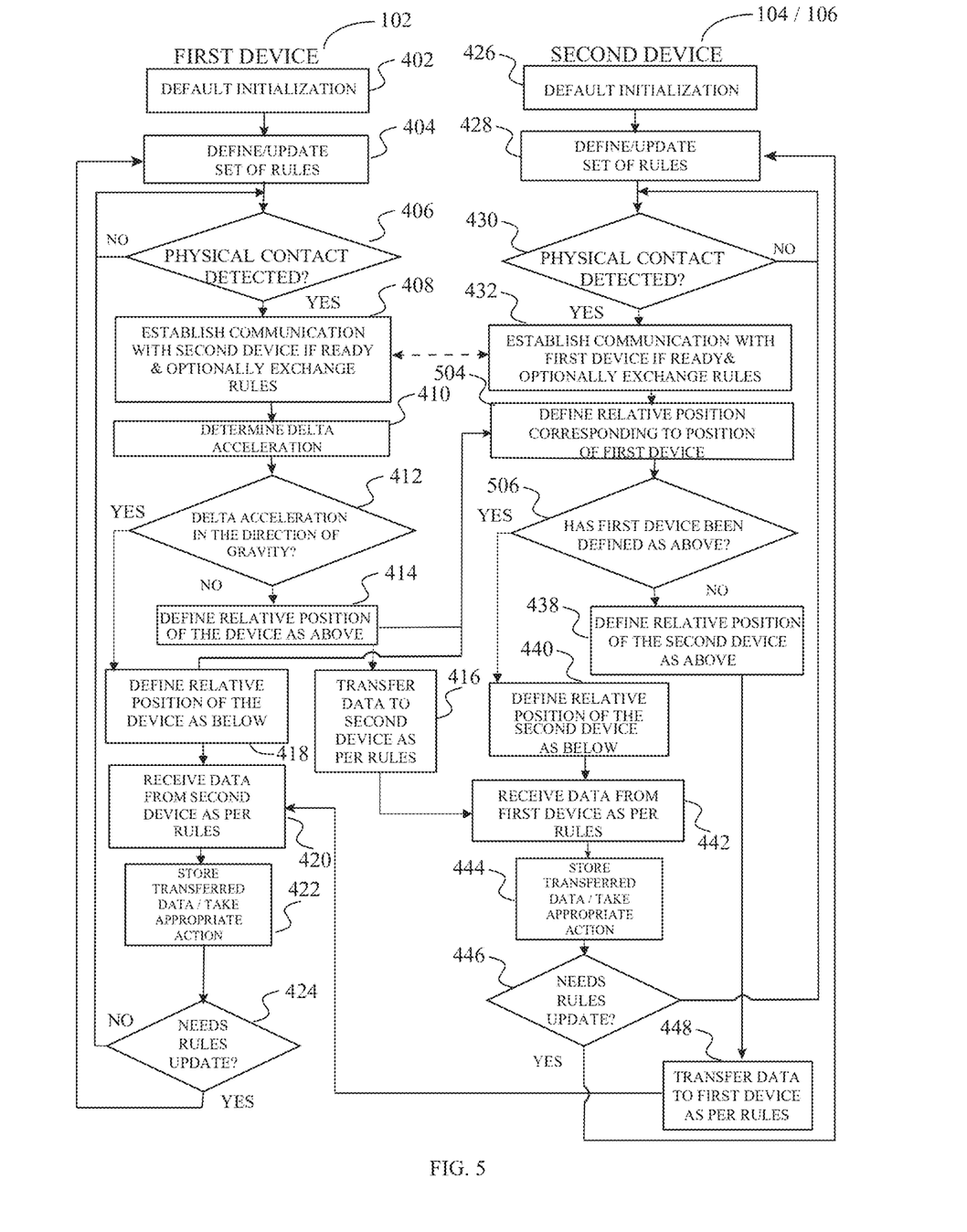
FIG. 5 is a flow diagram illustrating an exemplary process for impact-initiated information transfer between two devices when only one of them uses the sensor data to determine its relative position in accordance with an embodiment of the present invention.

Initially, the computer executable instructions for the impact initiated automated information transfer are loaded into the devices 102, 104 and 106 and the processor 105 executes the instructions for default initialization as in step 402 and 426 of FIGS. 4 and 5. The computer executable instructions may be downloaded and installed on the devices using methods known in the art.

As the present invention obviates the need to have a user interface or user inputs to carry out transfer of data from one device to another, it is essential that the devices already know as to how they have to behave when a physical contact is detected by them. A set of rules, as stored in memory 114 as in step 404 and 428, takes care of this by determining the actions to be taken by a device with regard to transfer of data subsequent to a physical impact. Some of the exemplary actions are listed in FIG. 6. For instance, if the latest rule instruction 602 says deletion of all the information 1 hour after last use, the receiving/lower device performs that action once it receives data from an upper device. Again, for example, if the instruction 604 is to sleep for the next 6 hours after a download, the receiving/lower device puts itself to sleep mode for the next 6 hours after receiving the data.

Figure 2A:
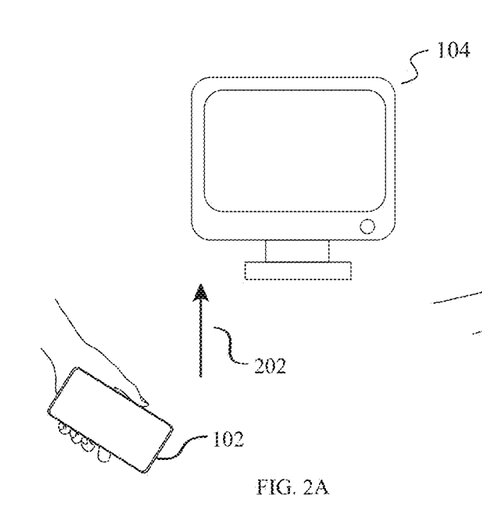
FIG. 2A illustrates an exemplary scenario of a first device moving toward a second device located above the first device in accordance with an embodiment of the present invention.
Figure 2B:
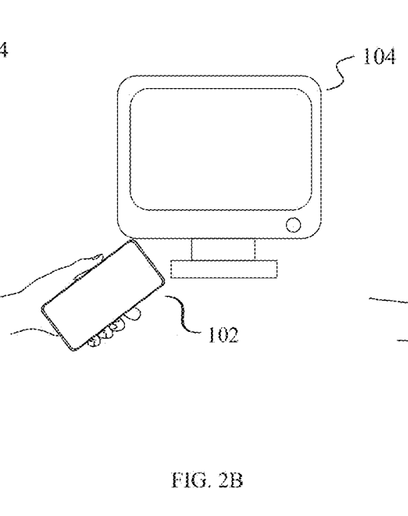
FIG. 2B illustrates an exemplary scenario of the first device making a physical contact with the second device located above it in accordance with an embodiment of the present invention.

To make the second device 104 transfer a set of data to the first device 102 i.e., from the desktop computer to the mobile device in the present example, the first device 102 has to be in a position below the second device 104 as shown in FIG. 2A in accordance with an embodiment of the present invention. The first device 102 is then moved toward the second device 104 from its initial position as shown in FIG. 2A to the final position as shown in FIG. 2B to make a physical contact with the second device 104. Thus, a physical contact between the first device 102 and the second device 104 occurs when a user causes a first movement to any or both the devices so that the distance between the first device 102 and the second device 104 changes from a first distance to a second distance closer to each other and they finally collide. In FIGS. 2A-2B, the first movement made by first device 102 is toward a direction 202 which is opposite to the direction of gravity "G".

An object located in the field of Earth experiences a gravitational pull and the resulting acceleration is called gravitational acceleration or acceleration due to gravity. The gravitational acceleration value defined by the standards is approximately 9.8 m/s$^2$. Accelerometers measure proper acceleration and can take into account this gravitational acceleration. Thus, to obtain the value of acceleration experienced by on object under the influence of an external force, the gravity factor (i.e., 9.8 m/s$^2$) in the correct direction must be subtracted from the acceleration vector measured by an accelerometer. In the context of the present invention, this change in acceleration experienced by an object during a physical contact is hereinafter referred to as "delta acceleration". Further, the terms "positive delta acceleration" and "negative delta acceleration" are used hereinafter to refer to "delta accelerations" having positive value and negative value respectively.

As the forces experienced by the first device 102 and the second device 104 during the impact are equal in magnitude and opposite in direction in accordance with the laws of motion, the first device 102 during the impact experiences a force in the direction opposite to its direction of movement before it made the physical contact. As a result, the first device 102 experiences a second acceleration in the direction 204 as shown in FIG. 2D which is opposite to the direction of the first movement 202 experienced by the first device 102 prior to the physical contact.

Figure 2C:
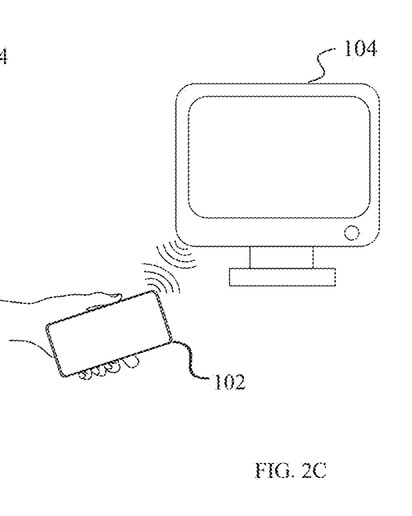
FIG. 2C illustrates an exemplary scenario of a first device communicating with a second device in accordance with an embodiment of the present invention.
Figure 2D:
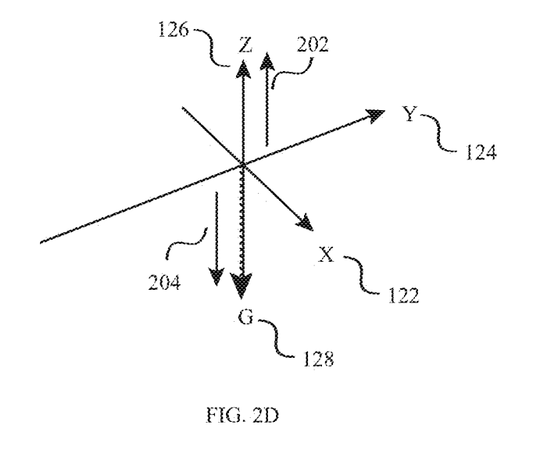
FIG. 2D illustrates the directions of motion or acceleration experienced by the first device before and during/after the impact resulted from the physical contact when the first device is located below the second device.

As soon as the devices detect a physical contact, as in steps 406 and 430, with the help of the data received from their respective sensor modules 112, they establish a wireless communication with each other as shown in FIG. 2C with the help of technologies known in the art as in steps 408 and 432. In some embodiments, the devices 102 and the 104 also exchange information which may include information on their already defined respective set of rules.

Each of the sensor modules 112 produces a movement vector corresponding to the change in movement experienced by the respective devices. In one embodiment, the movement vector so produced is an acceleration vector comprising a plurality of acceleration values with respect to a plurality of axes of acceleration corresponding to the movement of the device. In the present example, a three-axis accelerometer produces its measurements representing the value of accelerations that correspond to the coordinate axes X, Y and Z. Accordingly, delta acceleration values for both the devices 102 and 104 are determined, as in steps 410 and 434 of FIG. 4, using the output of their respective sensor modules 112.

Acceleration, being a vector quantity, has two characteristics, a magnitude and a direction. In a preferred embodiment of the present invention, a change in movement/acceleration vector, resulting from a physical contact, substantially in the direction of gravity (in the direction of "G" as shown in FIG. 1C) is defined as a negative delta acceleration or negative delta movement, and a change in movement/acceleration vector, resulting from the physical contact, in the direction substantially opposite to the direction of gravity is defined as positive delta acceleration or positive delta movement. For example, in FIGS. 2A-2C, the first device 102 experiences a change in acceleration of −2 m/s$^2$ (negative acceleration) during the physical contact whereas the second device 104 experiences a change in acceleration of 1 m/s$^2$ (positive acceleration) during the same physical contact. In this case, the acceleration values measured by the respective accelerometers will be 7.8 m/s$^2$ for the first device 102 and 10.8 m/s$^2$ for the second device 104 (considering acceleration due to gravity as 9.8 m/s$^2$). So, when the devices calculate their respective delta acceleration values, they subtract 9.8 m/s$^2$ from the measured acceleration values given by the accelerometers for the applicable axis. Accordingly, in the present example, the delta acceleration value determined for the first device 102 will be −2 m/s$^2$ (7.8 m/s$^2$-9.8 m/s$^2$) and that for the second device 104 will be 1 m/s$^2$ (10.8 m/s$^2$-9.8 m/s$^2$), both substantially aligned with the direction of gravity but in opposite directions. A description of such delta acceleration vectors comprising a first range of delta acceleration values and a second range of delta acceleration values are predefined and included in the set of rules stored in the memory 114. In a preferred embodiment, the first predefined range of delta acceleration values is a predefined range of positive delta acceleration values and the second predefined range of delta acceleration values is a predefined range of negative delta acceleration values.

In the steps 412 and 436 of FIG. 4, the delta acceleration values/vectors corresponding to the sensor modules 112 are compared with the predefined description/range of delta acceleration vectors. If the determined delta acceleration vector of a device is found to be falling within the predefined range of positive delta acceleration vectors then a position of the device relative to the other device is defined to be an upper device located above the second device as in steps 414 and 438. Similarly, if the determined delta acceleration vector of a device is found to be falling within the range of predefined negative delta acceleration vectors then a position of the device relative to the other device is defined to be a lower device located below the second device as in steps 418 and 440.

Reference to FIGS. 2A-2C, in the present example, as the first device 102 is located below the second device 104 and it traverses a trajectory fairly along the axis of gravitational pull "G" when it makes the physical contact with the second device 104, it undergoes a delta acceleration in the direction of gravity "G" during and, sometimes, after the impact. Therefore, when the delta acceleration corresponding to the sensor module 112 of the first device 102 is compared with the predefined description of delta acceleration vectors, it is found to be falling within the predefined range of negative delta acceleration vectors and, thus, the first device 102 gets defined as a lower device in step 418. On the other hand, during the impact/physical contact, the second device 104 experiences acceleration in the direction opposite to "G" i.e., opposite to the direction of gravity. Therefore, when the delta acceleration vector generated by the sensor module 112 of the second device 104 is compared with the predefined description of delta acceleration vectors, it is found to be within the range of positive delta acceleration vectors and, thus, the second device 104 gets defined as an upper device in step 438. If a device does not move substantially vertically (along the axis of "G" shown in FIG. 1D, for example) prior to making a physical contact then the acceleration vectors so produced by the devices during the physical contact will not be in the vertical direction either. Consequently, such physical contacts will be ignored by the devices. In one embodiment, the predefined range of delta acceleration vectors may not necessarily be truly vertical but may comprise a plurality of delta movement/acceleration vectors representing movements/accelerations in directions within a certain angle from the absolute vertical direction.

In certain embodiments, the magnetometer of the sensor module 112 may be used in determining whether the direction of movement/acceleration is toward the center of Earth or is in the opposite direction.

Once the devices know their positions relative to each other, they act as per the set of rules defined for them. In one embodiment, with the execution of the rules, the upper device (second device 104 in FIGS. 2A-2C of the present example) gets configured to transmit a data and the lower device (first device 102 in FIGS. 2A-2C of the present example) gets configured to receive a data. The selection of data by a device for transmission depends on the rules (already stored in the device or which have been updated corresponding to a received set of data). The set of rules may comprise a rule for selecting the set of data based on the type of the devices involved. For example, for the following types of devices, there are many possible sets of data to transfer; the rules enable the upper device to select which of these data to transmit.

i. for a thermostat or a stove, the data to be transferred may include time and temperatures    ii. for a car, the data to be transferred may include information on seat position, temperature, favorite radio stations    iii. for a piece of lab equipment, the data to be transferred may include machine settings The set of rules may also comprise a rule on selecting the set of data based on a type of the data available in the upper device, a time of the physical contact, and a relative location/position of the devices (upper or lower). In instances, where there are multiple types of data available for transfer, then the data selection is determined by that device being above or below. For example.

i. For a printer, when below, the data to be received may include the last document stored for printing    ii. For a printer, when above, the data to be transferred may include printer name and URL for a computer to use For some devices, there are many different types of data that could be transmitted or received. In these cases, the rules applicable will be not just only for the type of the data but also the time or sequence of the physical contact and the relative location of the device. Following are examples of such instances— a) When a computer is below i.e., a lower device, and the information is being sent to that computer from an upper device, then the upper device sends the last information it received from another device. For example:
   i. If the device from which the intermediate device i.e., the present upper device received the last transmission was a printer, then the printer's name and URL will be transmitted to the computer from the intermediate device.
   ii. But, if the device from which the intermediate device i.e., the present upper device received the last transmission was also a computer (a Word document from a desktop, for example), then the intermediate device will transmit the relevant data (the data related to the Word document in the present example) and not the identification information.

b) When a computer is above, and the information is being sent from the computer to the lower device, then the information displayed in the computer's active window is downloaded. The relevant rules in this case for the upper device with regard to data transfer may include the following:
   i. If a computer's active window is a Microsoft application (e.g., Word, Excel, Outlook) then that document (all of it in Word, the specific tab in Excel, the specific message in Outlook, for example) is transmitted.
   ii. Otherwise, if a computer's active window is a web browser, then
      1. The web page and its URL are downloaded.
      2. If there is any TAP-XML (an instantiation of XML using a schema designed for the present invention for information transfer) code in the web page then, in addition to the web page and URL being transmitted the TAP-XML instructions are followed i.e., the rules get updated and the updated rules are subsequently followed. In some embodiments, a page on display (a webpage to be downloaded to a lower device, for example) on an upper device may be configured to present a form to receive a user input indicative of a request to define/edit the rules. If there are multiple TAP-XML constructs in a single web page, then all of them are followed. For example,
         i. Example 1-first construct instructs the receiving device to sleep for 6 hours.
         ii. Example 2-second construct instructs the receiving device to delete any URL information currently stored on the device
         iii. Example 3-third construct changes the rules on the receiving device: the receiving device will no longer receive and store URL information Continuing with the present example, as the first device 102 gets defined as a lower device and the second device 104 gets defined as an upper device, second device 104 transmits the data related to the window active on it in accordance with the set of rules as in step 448. Being the lower device, the first device 102 receives the data from the second device 104 as in step 420. The data gets stored in the lower device 102 and, if required, the lower device 102 may take one or more actions based on the received data as in step 422.

Figure 6:
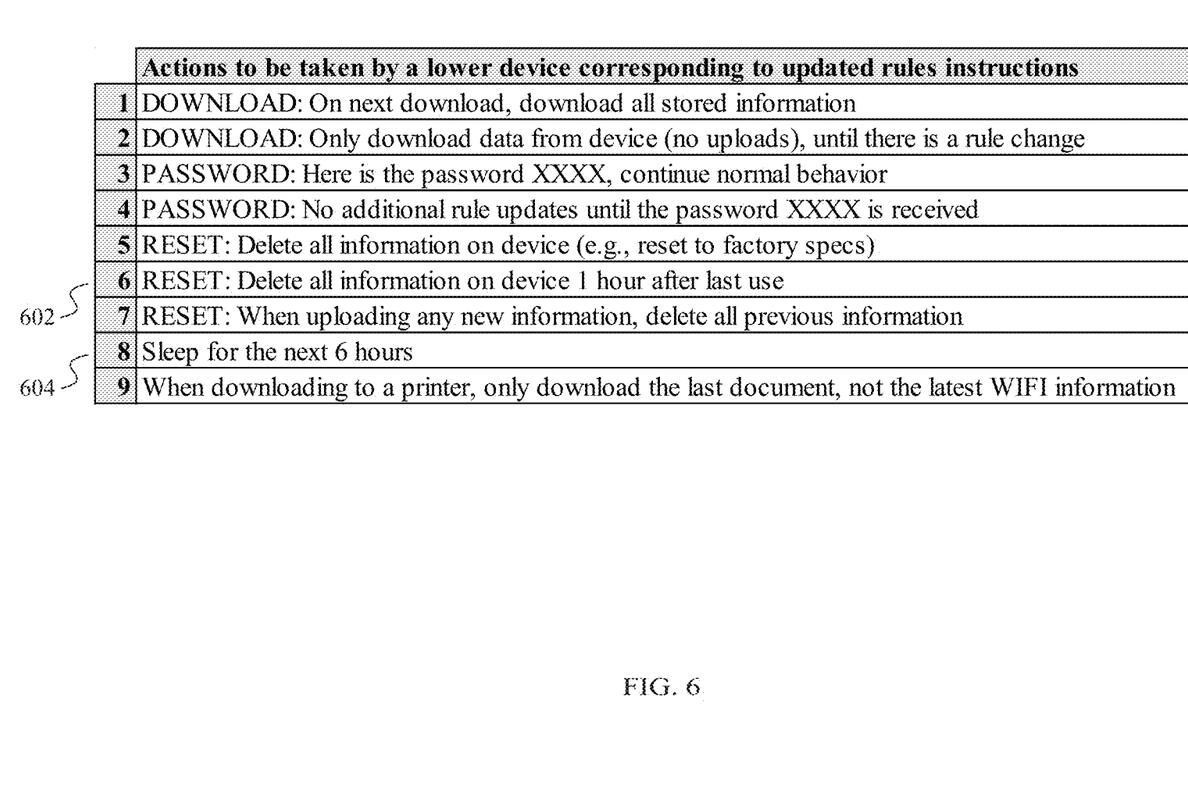
FIG. 6 illustrates examples of rules update instructions and actions in accordance with an embodiment of the present invention.

In some embodiments, the received data may include one or more instructions to update the rules stored in the lower device. Thus, if any such rule update instructions are found as in step 424, the set of rules stored in the device gets updated. For example, a web page downloaded from an upper device to a lower device may include instructions (e.g., represented in TAP-XML) to update the set of rules existed in a lower device. Examples of rules received along with the set of data may include instructions for the lower/receiving device such as "do not accept any new data until told otherwise," "resume default behavior," "delete all information stored and then only save the latest item in memory," "become inoperable for the next 12 hours" and the like. FIG. 6 illustrates some of the exemplary instructions transmitted by an upper device to a lower device to update the set of rules in the lower device. In case of a web page, for example, the web page might also contain a special code or a password so that only one specific lower/receiving device can implement the changes. Then, when the upper device downloads the information to the lower device those new rules can be implemented. In the context of the present example, the first device 102 checks the rules for any updates as in step 424 and takes appropriate actions accordingly.

Figure 3A:
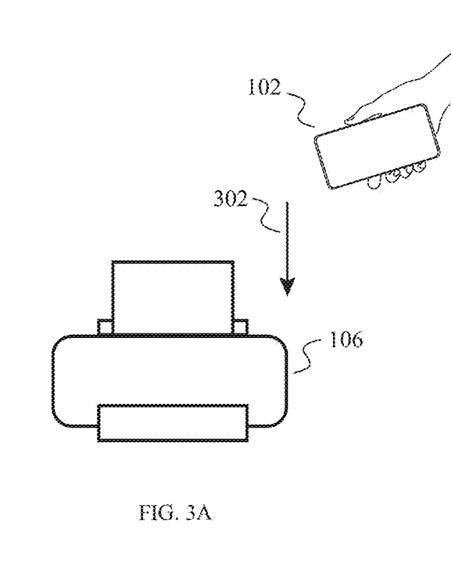
FIG. 3A illustrates an exemplary scenario of a first device moving toward a second device located below the first device in accordance with an embodiment of the present invention.
Figure 3B:
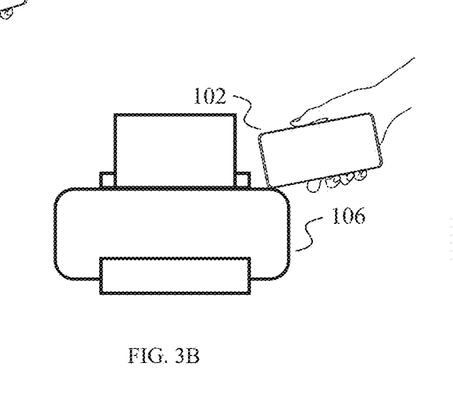
FIG. 3B illustrates an exemplary scenario of the first device making a physical contact with the second device located below it in accordance with an embodiment of the present invention.
Figure 3C:
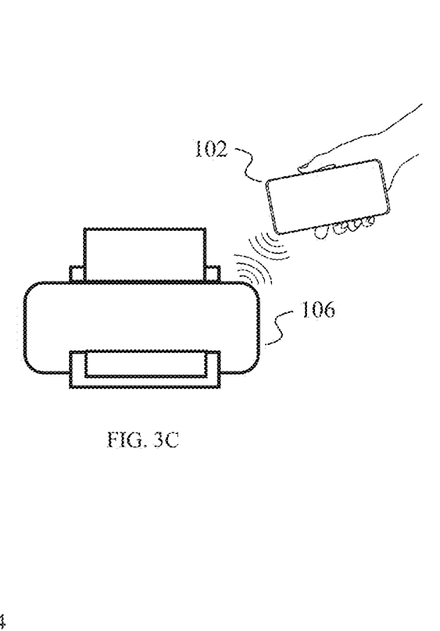
FIG. 3C illustrates an exemplary scenario of a first device communicating with a second device in accordance with an embodiment of the present invention.
Figure 3D:
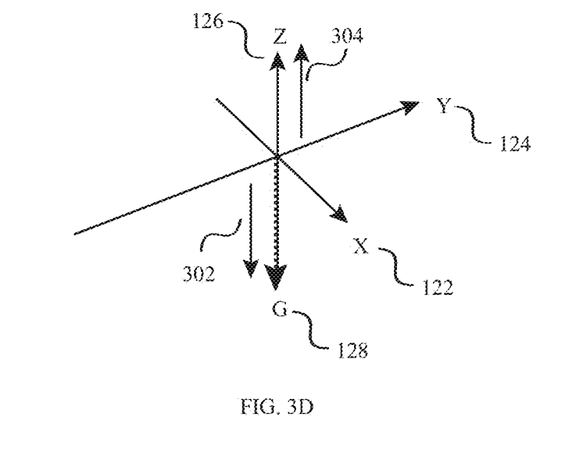
FIG. 3D illustrates the directions of motion or acceleration experienced by the first device before and during/after the impact resulted from the physical contact when the first device is located above the second device.

Now, the first device 102 acts as a carrier or intermediate device to deliver the data to a third device. In the present example, device 106 i.e., the printer, with reference to FIGS. 3A-3C, incorporates the present invention and is referred to hereinafter as the second device 106. As, on making a physical contact, the data gets automatically downloaded to a device from another device located at a relatively upper position, the first device 102 has to be placed above the second device 106 this time to get the stored data from the first device 102 downloaded to the second device 106. The first device 102 is then brought downward in the direction 302 until it makes a physical contact with the second device 106 as shown in FIGS. 3A and 3B. Reference to FIGS. 4 and 5, both the devices then carry out the same steps which were followed when the data transfer happened from the desktop 104 to the mobile device 102. But, this time, for making the physical contact the first device 102 travels a distance from above i.e., first movement/acceleration vector 302 is in the direction of gravity "G" and, as a result, the first device 102 experiences movement/acceleration 304 in the direction opposite to the direction of gravity "G" during/after the physical contact as shown in FIG. 3D. Accordingly, at step 412 the delta movement/acceleration vector generated by the sensor module 112 of the first device 102 is found to be falling within the predefined range of positive delta acceleration vector. As a result, the first device 102 is defined to be an upper device as in step 414. On the other hand, at step 436 the movement/acceleration vector generated by the sensor module 112 of the second device 106 is found to be falling within the predefined range of negative delta acceleration vector. Accordingly, the second device is defined to be a lower device as in step 440.

Once the devices know their relative positions with respect to each other, the first device 102 automatically transfers the stored data i.e., the data related to the active window on the desktop computer 104 to the second device 106 in accordance with the rules as in step 416. In the present example, as the second device 106 is a printer, as soon it receives the data from the first device 102, as in step 442, it stores the data and/or takes appropriate action (prints the data in the present example), as in step 444, which originally came from the desktop computer 104. Additionally, the second device 106 checks the received data for any need to update the rules which are already stored in it as in step 446 and takes appropriate actions. In this example, if the first device 102 as a lower device makes a physical contact with the upper device printer 106, the data downloaded from the printer 106 may include the printer name and its URL address. If the first device 102 then bangs a computer from above then the printer information gets added to the list of printers of that computer.

As can be seen in the exemplary implementation of the present invention described above, to make the data transfer occur in a desired direction, it just needs the physical contact of the devices substantially in or opposite to the direction of gravity. Apart from moving one of the devices to make a physical contact between them no other user input is required to complete the data transfer process. In fact, in some embodiments, a device devoid of any user interface can be custom made incorporating the present invention and would still work the same intended way. FIG. 1B illustrates such an embodiment of the present invention in the form a wearable ring 101. Some of the other exemplary use case scenarios of the present invention are given below. In these scenarios either a mobile phone or a custom-made ring similar to that shown in FIG. 1B can be used as an intermediate device to receive data from one or more devices, store it in its memory and then transfer the data to one or more other devices (provided all the involved devices incorporate the present invention).

Use case A: Put an air conditioner instantly at the same settings as that of another air conditioner.

Steps to be Followed by a User—
1. Put on the ring 101
2. Walk to thermostat of an air conditioning system of a room
3. Bang the bottom of thermostat with the ring 101
   Effect: The thermostat (upper device) downloads information (times and temperatures) to the ring (lower device)
4. Walk to thermostat of another room
5. Bang the top of the thermostat with the ring 101
   Effect: The ring 101 (upper device) downloads information (times and temperatures) to that thermostat (lower device)
6. Walk to the thermostat in someone else's home
7. Bang the top of the thermostat with the ring 101
   Effect: The ring (upper device) downloads information (times and temperatures) to that thermostat (lower device)
8. Drive to a hotel and stay in a room with a present invention incorporated thermostat. To set the temperature to the home setting, bang the top of the hotel thermostat with the ring 101
   Effect: The ring downloads information (times and temperatures) to the hotel thermostat.

Use case B: Instantly set a toaster oven for a desired recipe.

Steps to be Followed by a User—
1. Take a mobile phone which has the present invention implemented in it
2. Walk to the computer showing a recipe from a web site
3. Bang the bottom of the computer with the mobile phone
   From the website shown, the only thing that makes sense to download are the entire web page and, via TAP-XML encoding, for example, the cooking time and temperature
   Effect: The computer downloads both the entire web page and the content (cooking time and temperature) to the mobile phone
4. Walk to a toaster oven
5. Bang the top of a toaster oven with the mobile phone
   Effect: The mobile phone downloads information (cooking time and temperature) and starts the cooking cycle Use case C: Instantly set car configurations.

Steps to be Followed by a User—
1. Put on the ring
2. Walk to the car which has the desired configuration
3. Bang the bottom of the car's dash with the ring 101
   Effect: The car downloads information (e.g., seat position, radio station settings, temperature and fan settings) to the ring
4. Walk to another car
5. Bang the top of the new car's dash with the ring.
   Effect: The ring downloads the recorded car information
6. Drive to a friend's house, walk up to their thermostat, and bang the top of their thermostat with the ring. The ring downloads the information that been stored previously in use case A.
   It is to be noted that the ring i.e., the intermediate device simultaneously and persistently holds information from multiple contexts.

Use Case D: Instantly Set Equipment Configurations

An experiment to be carried out in a chemistry lab involves programming a variety of machines (e.g., one machine may have 50 heating and cooling cycles, for different lengths of time with different temperatures) and the description on how to perform the experiment is found on the internet. If the present invention is not implemented then a user had to learn the user interface of each piece of equipment, copy the experiment's information from the web and then enter the information into each piece of equipment using their user interfaces to complete the experiment. But, with the present invention implemented in each piece of equipment and in the computer, the user has to follow just the following steps to get the experiment done.
1. Put on the ring or take the mobile device
2. Tap the ring or the mobile device on the bottom of the computer which is displaying the required information or which has the required information.
   Effect: The ring or the mobile device now "holds" relevant information for all the equipment
3. Go to each piece of equipment and tap the ring or the mobile device against the top of that equipment.
   Effect: Each piece of equipment gets the required information to perform the test.

The present invention does not necessarily need both the transmitting and receiving devices to determine their relative positions individually. Instead, one of the devices can determine its relative position (above or below) and let the other device with whom it made a physical contact know that relative position. The other device can then define itself a position opposite to the relative position of the first device. In the context of the aforementioned example of data transfer from a desktop computer 104 to a printer 106 with the use of a mobile device 102 as an intermediate device, the present invention will work even when the desktop computer 104 and the printer 106 are able to just detect a physical contact but do not possess any accelerometers or similar sensors. FIG. 5 shows the steps for such an implementation of the present invention. Here, the second device 104/106 receives information on the relative position of the first device 102 from the first device 102 as determined at step 414 or at 418. On receiving this information, the second device 104/106 tries to determine its own position (above or below) relative to the first device 102 as in step 504. For this, the second device 104/106 finds out as to whether the first device 102 has been defined as an "upper device" or a "lower device" as in step 506. If the first device 102 is found, as in step 440, to have been defined as an upper device then the second device 104/106 gets defined as a lower device. Similarly, if the first device 102 is found, as in step 438, to have been defined as a lower device then the second device 104/106 gets defined as an upper device. The rest of the process is same as that shown in FIG. 4.

Flowcharts are used to describe the steps of the present invention. While the various steps in this flowchart are presented and described sequentially, some or all of the steps may be executed in different orders, may be combined or omitted, and some or all of the steps may be executed in parallel. Further, in one or more of the embodiments of the invention, one or more of the steps described above may be omitted, repeated, and/or performed in a different order. In addition, additional steps, omitted in the flowchart may be included in performing this method. Accordingly, the specific arrangement of steps shown in FIGS. 4 and 5 should not be construed as limiting the scope of the invention.

The invention claimed is:

1. A method for impact initiated automated information transfer, said method comprising:
    detecting a physical contact between a first device and a second device;
    establishing a wireless communication between said first device and said second device on detecting said physical contact;
    determining a first delta acceleration value corresponding to said first device during said physical contact;
    comparing said determined first delta acceleration value with a predefined range of negative delta acceleration values representing a change in acceleration in a direction of gravity and with a predefined range of positive delta acceleration values representing said change in acceleration in a direction opposite to said direction of gravity; and
    defining said first device to be an upper device located above said second device if said determined first delta acceleration value falls within said predefined range of positive delta acceleration values, or to be a lower device located below said second device if said determined first delta acceleration value falls within said predefined range of negative delta acceleration values.

2. The method of claim 1, wherein said upper device comprises at least one processor and a non-transitory machine-readable storage medium having a set of rules stored therein which, when executed by said at least one processor, selects a set of data from said upper device.

3. The method of claim 2, wherein said lower device comprises at least one processor and a non-transitory machine-readable storage medium having said set of rules stored therein which, when executed by said at least one processor, configures said lower device to take one or more actions.

4. The method of claim 2, wherein said upper device is configured to wirelessly transmit said set of data in accordance with said set of rules.

5. The method of claim 2, wherein said lower device is configured to receive said set of data from said upper device in accordance with said set of rules.

6. The method of claim 2, wherein said set of data includes one or more rules of said set of rules.

7. The method of claim 2, wherein said set of rules in said lower device is updated based on said set of data.

8. The method of claim 2, wherein said set of rules comprises a rule on selecting said set of data based on a type of said set of data, a type of said upper device and said lower device, a time of said physical contact, a sequence of said physical contact and a relative location of said first device and said second device.

9. The method of claim 1, further comprising:
    determining a second delta acceleration value corresponding to said second device during said physical contact;
    comparing said determined second delta acceleration value with said predefined range of negative delta acceleration values and said predefined range of positive delta acceleration values; and
    defining said second device to be said upper device located above said first device if said determined second delta acceleration value falls within said predefined range of positive delta acceleration values, or to be said lower device located below said first device if said determined second delta acceleration value falls within said predefined range of negative delta acceleration values.

10. A system for impact initiated automated information transfer, said system comprising:
    a first device and a second device, each comprising at least one processor and a non-transitory machine-readable storage medium having a set of rules stored therein; and
    a sensor module disposed in said first device to generate an acceleration vector on detecting a physical contact between said first device and said second device, said acceleration vector being used to determine a delta acceleration value by deducting a value of acceleration due to gravity from said acceleration vector;
    wherein, said delta acceleration value is compared with a predefined range of negative delta acceleration values representing a change in acceleration in a direction of gravity and with a predefined range of positive delta acceleration values representing said change in acceleration in a direction opposite to said direction of gravity to define said first device to be an upper device located above said second device if said determined delta acceleration value falls within said predefined range of positive delta acceleration values, or to be a lower device located below said second device if said determined delta acceleration value falls within said predefined range of negative delta acceleration values.

11. The system of claim 10, wherein said upper device is configured to wirelessly transmit a set of data in accordance with said set of rules.

* * * * *